United States Patent [19]

Vidal et al.

[11] 4,160,848

[45] Jul. 10, 1979

[54] ANTISTALING AGENT FOR BAKERY PRODUCTS

[75] Inventors: Frederick D. Vidal, Englewood Cliffs; Albert B. Gerrity, Holmdel, both of N.J.

[73] Assignee: Pennwalt Corporation, Philadelphia, Pa.

[21] Appl. No.: 788,193

[22] Filed: Apr. 18, 1977

[51] Int. Cl.² ............................................. A21D 2/16
[52] U.S. Cl. ...................................... 426/24; 426/20; 426/25; 426/64; 426/549; 426/653
[58] Field of Search ................. 426/653, 549, 20, 24, 426/25, 64

[56] References Cited

U.S. PATENT DOCUMENTS

| | | | |
|---|---|---|---|
| 2,615,810 | 10/1952 | Stone | 426/20 |
| 3,368,903 | 2/1968 | Johnson et al. | 426/20 |
| 3,433,645 | 3/1969 | Egan et al. | 426/24 |
| 3,464,829 | 9/1969 | Geminder et al. | 426/653 X |
| 3,479,189 | 11/1969 | Vrang et al. | 426/653 |
| 3,578,462 | 5/1971 | Smerak et al. | 426/549 X |
| 3,592,660 | 7/1971 | Neu | 426/653 X |
| 3,671,459 | 6/1972 | Norris | 426/653 X |

OTHER PUBLICATIONS

Pomeranz et al., "Use of Amyloglucosidase in Breadmaking", *Food Technology*, Oct. 1964, pp. 138–140.

*Primary Examiner*—Raymond N. Jones
*Assistant Examiner*—Esther M. Kepplinger

[57] ABSTRACT

The staling of bakery products, e.g., bread and rolls, is retarded when said products are prepared from dough containing a combination of (1) a glycerol ester of a $C_{10}$–$C_{24}$ fatty acid wherein at least 10 weight percent of said esters are monoesters and (2) a free $C_{14}$–$C_{20}$ fatty acid, a sodium or magnesium salt of a $C_{14}$–$C_{20}$ fatty acid or a pentaerythritol monoester of a $C_{14}$–$C_{20}$ fatty acid. Optionally, but preferably, the combination includes a third ingredient consisting of an enzyme product selected from alpha-amylase, amyloglucosidase and mold derived lipase.

12 Claims, No Drawings

ANTISTALING AGENT FOR BAKERY PRODUCTS

This invention relates to an improved antistaling composition used in the preparation of bakery products. More particularly, it concerns a composition which is a combination of glycerol esters, certain fatty acids or certain salts thereof or pentaerythritol monoesters thereof and, preferably certain enzymes, and which composition, when incorporated in dough used to prepare bakery products, provides unexpectedly improved antistaling characteristics for such products.

U.S. Pat. No. 3,433,645 to Egan et al., discloses a dough conditioner and extender which is an ethoxylated glycerol ester of a fatty acid and shows the use of the ethoxylated product in conjunction with a common commercially available monoglyceride. The combination of glycerol monostearate and ethoxylated glycerol monostearate has been commercially available as a flour and dough additive for several years.

U.S. Pat. No. 2,615, 810 to Stone discloses the incorporation of thermally stable alpha amylase to the dough to inhibit the staling of bakery products produced therefrom.

U.S. Pat. Nos. 3,368,903, 3,527,644 and 3,578,462 show the inclusion of lipase and fungal alpha amylase to dough prior to baking.

It has now been found that a specified combination of compounds, as described hereinafter, lends much improved antistaling characteristics to bakery products prepared from dough to which the combination has been admixed.

Accordingly, this invention concerns a composition of matter comprising a glycerol ester of a $C_{10}$–$C_{24}$ saturated aliphatic fatty acid wherein at least 10 weight percent of said ester is a monoester, and for each part by weight of said ester, from about 0.25 to about 1.0, preferably 0.3 to 0.65, part of a component selected from the group consisting of a free $C_{14}$–$C_{20}$ saturated aliphatic fatty acid, sodium stearate, magnesium sterate, a pentaerythritol monoester of a $C_{14}$–$C_{20}$ saturated aliphatic fatty acid and mixtures thereof.

The above composition preferably contains an enzyme product selected from the group consisting of alpha amylase, amyloglucosidase, mold derived lipase and mixtures thereof in an amount sufficient to provide increased antistaling characteristics to a bakery product prepared from a dough containing an effective amount of said composition.

From about 30 to about 50, preferably about 35 to about 45 weight percent of the above described glycerol ester may be a condensation product of ethylene oxide, the ethylene oxide portion consisting of from about 10 up to about 95 weight percent of said condensation product.

A preferred combination of components comprises (1) a mixture of glycerol monostearate and ethoxylated glycerol monostearate, (2) stearic acid and (3) alpha amylase.

The term $C_{10}$–$C_{24}$ saturated, aliphatic fatty acids used herein to define the acids of the glycerol esters and ethoxylated glycerol esters means a fatty acid having from 10 to 24 carbon atoms; preferably from 14 to 20 carbon atoms, and most preferably 18 carbon atoms. Examples of such materials are those obtained from a source including vegetable and animal oils or fats as is well known in the art. The glycerol esters may contain from as little as 10 weight percent up to 90 weight percent or more total (alpha plus beta forms) monoglycerides, the balance comprising one or more of the diglyceride, triglyceride, or glycerine. Typically, the monoglycerides will be present as a part of a mixture with all three of these products and such mixtures as well as substantially pure monoglyceride are included within the meaning of glycerol esters for this invention.

The ethoxylated glycerol monoesters of $C_{10}$–$C_{24}$ fatty acids are condensation products or adducts of ethylene oxide and a glycerol monofatty acid ester wherein the amount of ethylene oxide ranges from about 10 to about 95 weight percent of the condensation product. A preferred amount of ethylene oxide is from about 45 to about 75 percent while condensation products having from 60.5 to 65.0 weight percent of ethylene oxide are presently approved by the Food and Drug Administration for use in bakery products.

The free $C_{14}$–$C_{20}$ saturated, aliphatic fatty acids as referred to herein, are fatty acids having from 14 to 20 carbon atoms. The preferred fatty acid is stearic acid. Likewise, the fatty acid residue of the pentaerythritol monoester is obtained from a saturated aliphatic fatty acid having from 14 to 20 carbon atoms, preferably stearic acid.

Enzymes employed in the preferred embodiment of this invention are alpha amylase, amyloglucosidase and mold derived lipase; alpha amylase being preferred from the stand point of commercial availability.

Few enzymes are marketed in pure form and the pure enzyme content of commercial enzyme preparations varies considerably. The manufacturer generally assays the enzyme content of its material and expresses such content in terms of activity, frequently in specified units measured by a specified procedure.

Alpha amylase is a diastatic enzyme most frequently derived from commercial purposes from the mold *Aspergillus Oryzae*. However, this enzyme is also available from other sources as is well known in the art. The alpha amylase used herein was a commercial preparation derived from Aspergillus Oryzae and sold by Rohm and Haas under the trademark Rhozyme S. The active content of this enzyme preparation is expressed as its "saccharifying activity" and it is standarized at 1.85 Saccharifying Units (SU) per gram. Saccharifying activity is described in Rohm and Haas Company literature as an arbitrary unit which expresses the ability of the enzyme to raise the dextrose equivalent (DE) of a corn syrup. An enzyme has unit activity if 0.05% (on dry substance basis) will raise the DE of a 52.2° Brix syrup to 65 in 48 hours at 55°C. under the test conditions. Degrees Brix is the weight of soluble solids expressed as percent sucrose.

For the purposes of this invention, the range of amount of alpha amylase beneficially used in the composition is from about 0.006 to about 0.46 SU for each part by weight of the antistaling mixture of glycerol ester and free fatty acid or pentaerythritol monoester, preferably about 0.03 SU. Generally, the foregoing range of amounts based on the antistaling composition will provide from 0.00185 to about 0.185 SU, preferably 0.0092 SU for each 100 grams of baking flour when the antistalling composition is added to flour or dough in the prescribed amount.

Amyloglucosidase is an enzyme derived for commercial use from molds, particularly *Aspergillus Niger*. The amyloglucosidase preparation used herein was a product of Rohm and Haas purchased under the trademark Diastase 81. The activity of the amyloglucosidase in this preparation is expressed as DSU (Dextrin Saccharifying Units) and Diastase 81 contains from 10 to 30 DSU. Dextrin Saccharifying Units are a measure of the ability of an enzyme to hydrolyze corn-white dextrin. An amount of enzyme containing 0.025 DSU will affect 35% hydrolysis of 30 mg. of corn-white dextrin in a total volume of 30 ml. in one hour at 40° C. The range of amounts of amyloglucosidase beneficially used in the composition is from about 0.06 to about 6.5 DSU for each part by weight of the antistaling mixture of glycerol ester and free fatty acid (and/or fatty acid salt and/or pentaerythritol monoester), preferably about 0.32 DSU. The foregoing range of amounts of amyloglucosidase, based on the antistaling composition, will provide from about 0.01 to about 3.0 DSU preferably about 0.05 to 0.15 DSU. for each 100 grams of baking flour to which the composition is added in the prescribed amounts.

The lipase used for this invention was Lipase AW, an enzyme prepared from the mold Aspergillus Oryzae and manufactured by Wallerstein Company. This enzyme is standardized with lactose to contain 4000 Wallerstein Lipase Activity (WLA) units per gram. These WLA units are measured by the Liberation of fatty acid. A WLA unit is defined as that quantity of lipase which will liberate one microequivalent of fatty acid per minute at 30° and a pH of 6.5.

The range of amounts of lipase beneficially employed in the composition is from about 100 to about 800 WLA units for each part by weight of the antistaling mixtures of glycerol ester and free fatty acid (and/or fatty acid salt and/or pentaerythritol monoester). The foregoing range of amounts of lipase, based on the antistaling composition, will provide from about 20 to about 200 WLA units, preferably about 80 WLA units per 100 grams of flour when the composition is incorporated in flour or dough in the prescribed amounts.

The antistaling composition of this invention is preferably employed in powder, granular or tablet form. Edible fillers or carriers such as corn starch, microcrystalline cellulose, sucrose, dextrose, dextrins, salt, non-fat milk powder, dicalcium phosphate, calcium sulfate dihydrate and the like may be used in conjunction therewith.

While the antistaling composition is preferably employed as a mixed combination, it may also be incorporated in the dough by mixing part thereof with some dough ingredients and part with other dough ingredients before all are combined in the final dough product.

The composition is incorporated in flour or in a dough preparation for preparing bakery products in amounts ranging from 0.2 to about 1.3 parts, preferably about 0.3 to about 0.6 parts, for each 100 parts by weight of flour.

The antistaling compositions may be employed equally as well in either a "straight" dough baking procedure, a "sponge" dough baking procedure or a "continuous" dough baking procedure. While yeast-raised dough is preferred dough for the bakery products used herein, other types of dough may be employed. Dough mixing and fermentation, as well as dividing, rounding, intermediate proofing, molding, panning, proofing and baking, are conventional process steps which are used in accordance with this invention for preparing the dough and obtaining a satisfactory baked product. Such procedures are well known in this art.

The antistaling properties of baked products prepared to demonstrate this invention were determined by means of a compressibility test using a Baker Compressimeter. This instrument is a device designed to measure the compressibility or deformation of the bakery product by subjecting it to applied pressure and providing readings of the applied pressure. Readings for the test product are generally recorded over a period of days to provide an indication of the staling rate of the product.

In the following examples, doughs for bread were prepared from a standard recipe by the "sponge" dough method. The recipe is as follows:

| BAKING FORMULA | grams | | |
|---|---|---|---|
| Flour | 700 | | |
| Sugar | 42 | | |
| Salt | 14 | | |
| Dry Skim Milk | 21 | | |
| Shortening (hydrogenated vegetable oil) | 21 | | |
| Yeast | 17.5 | | |
| Yeast Food | 1.75 | | |
| Malt | 0.8 | | |
| Potassium Bromate | 10 ppm | | |
| Water, variable | about 60% | | |
| SPONGE | grams | DOUGH-UP | grams |
| Flour | 400 | Flour | 300 |
| Yeast | 17.5 | Sugar | 42 |
| Yeast Food | 1.75 | Salt | 14 |
| Malt | 0.8 | Dry Milk | 21 |
| Potassium Bromate | 6ppm | Shortening | 21 |
| Water | 240 ml | Potassium Bromate | 4ppm |
| | | Water, about | 200 ml. |

The sponge is first prepared by mixing the ingredients of the sponge recipe together in a Hobart mixer for one minute at a low speed and for one minute at intermediate speed.

After the sponge ferments for about 4 hours it is used to prepare the dough by adding it to the ingredients of the Dough-up recipe, mixing for one minute at low speed and from four to five minutes at intermediate speed. The dough rests for twenty minutes, is molded into two loaves of 520 g. each, proofed for about one hour and baked for eighteen minutes at 410° F. (210° C.)

The following table depicts, for Examples 1-5, antistaling additives and combinations thereof which were incorporated in the above described recipe and the baked products thereof tested over a period of time for softness with the Baker Compressimeter. The percentage amounts given are based on the weight of the flour in the dough.

Table I

| | |
|---|---|
| Example 1 | 0.3% glycerol monostearate (added to sponge) |
| Example 2 | 0.5% of a mixture of 60 parts by weight glycerol monostearate and 40 parts ethoxylated glycerol monostearate consisting of about 55 weight percent ethylene oxide (added to shortening) |
| Example 3 | 0.24% of the mixture of Example 2 and 0.1% stearic acid (added to sponge) |
| Example 4 | 0.24% of the mixture of Example 2 (added to shortening) and 0.005% (0.0092 SU alpha amylase per 100 g flour) Rhozyme S (added to sponge) |
| Example 5 | 0.24% of the mixture of Example 2 0.1% stearic acid (both added to shortening) and 0.005% (0.0092 SU alpha amylase per 100 g. flour) |

Table I-continued

Rhozyme S (added to sponge)

The average results of periodic compressibility tests on individual ½ inch thick slices of bread prepared using the above recipe and the antistaling agents of Examples 1-5 are set forth in the following table. The data of the following table are the weight in grams required to compress the test sample of bread 1½ centimeters and 2 centimeters, respectively.

Table II

| Antistaling Agent (Ex. No.) | COMPRESSIBILITY TEST (grams) | | | | | | | |
|---|---|---|---|---|---|---|---|---|
| | 24 hours | | 72 hours | | 144 hours | | 192 hours | |
| | 1½ cm | 2 cm | 1½ cm | 2 cm | 1½ cm | 2 cm | 1½ cm | 2 cm |
| 1 | 13.4 | 15.7 | 21.4 | 25.3 | 31.7 | 35.7 | 31.3 | — |
| 2 | 13.1 | 15.3 | 20.1 | 23.6 | 17.1 | 321.3 | 32.6 | — |
| 3 | 13.7 | 15.7 | 20.1 | 23.7 | 27.7 | 32.1 | 31.8 | — |
| 4 | 13.3 | 16.2 | 19.3 | 22.7 | 30.1 | 33.9 | 33.9 | — |
| 5 | 12.6 | 14.7 | 18.9 | 22.2 | 29.0 | 32.8 | 30.5 | — |

The data set forth in the above Table will demonstrate to one skilled in the art that:

(1) at an additive level of 0.3%, the glycerol ester per se (Example 1) provided the expected antistaling characteristics for the bakery product;

(2) at a combined additive level of 0.5%, a mixture of the glycerol ester (60%) and ethoxylated glycerol ester (40%) (Example 2) provided about equivalent antistaling characteristics for the bakery product as did the 0.3% glycerol ester of Example 1;

(3) at a combined additive level of 0.34% the mixture of glycerol ester and ethoxylated glycerol ester (0.24%) and fatty acid (0.1%) unexpectedly provided as good antistaling characteristics as 0.5% of the mixture of Example 2;

(4) at a combined additive level of 0.245% the mixture of glycerol ester and ethoxylated glycerol ester (0.24%) and the alpha amylase enzyme product (0.0092 SU/100 g flour-equivalent to 0.005%) did not perform as favorably with respect to antistaling characteristics as the combination of Example 3; and (5) at a combined additive level of 0.345%, the mixture of glycerol ester and ethoxylated glycerol ester (0.24%), the fatty acid (0.1%) and the alpha amylase enzyme product (0.0092 SU) initially provided the softest bakery product and thereafter provided comparable or better antistaling characteristics than those provided by the additives of the prior examples.

Under present pricing conditions for the various additives involved, the above data demonstrates that the use of the fatty acid in combination with the glycerol ester and, preferably, the combination of fatty acid and enzyme with glycerol esters will produce as good or better antistaling characteristics for bakery products at substantially reduced additive costs without compromise of other additive improvement properties for example, dough improvement and product texture.

Similar improvement data has been developed for the amyloglucosidase and mold derived lipase when used in combination with the fatty acid to improve the antistaling characteristics of bakery products prepared using glycerol esters.

In the following examples, doughs for bread were prepared from a standard recipe by the "continuous" dough method. Presents are based on the weight of the flour in the dough. The recipe is as follows:

| BROTH | Percentages |
|---|---|
| Sugar | 8.00 |
| Salt | 2.25 |
| Dry Milk Powder | 3.00 |
| Arkady | 0.5 |
| Calcium acid phosphate | 0.1 |
| Sodium propionate | 0.1 |
| Yeast | 2.5 |
| Water | about 65.0 |
| DOUGH-UP | |
| Flour | 100.00 |
| Shortening | 3.0 |
| Oxidizing Agent | 0.005 |

"No flour" broths (100% of flour added at dough-up stage) are fermented 2½ hours at 87° F. (30.5° C.), and "flour" broths (broths in which a portion of the flour is mixed prior to dough-up stage) are fermented for two hours.

Upon completion of fermentation, the broth is incorporated with the balance of the formula ingredients to form a premix dough in a Hobart mixer by mixing 45 seconds at low speed and 15 seconds at medium speed. The premix dough is transferred to a high speed double impeller batch mixer where it is developed in approximately two minutes. After development the dough is hand divided into dough pieces weighing 520 grams each, moulded and placed in baking pans. The panned dough pieces are proofed about one hour at 102° F. (39° C.) and 98% relative humidity. The proofed dough is then baked 18 minutes at 410° F. (210° C.).

The following table sets forth, for Examples 6-20, the antistaling additives and combinations thereof which were incorporated at either the broth or dough-up stage in the above described recipe. Examples 6-10 concern "no-flour" broths, Examples 11-15 concern 25% flour broths and Examples 16-20 concern 50% flour broths. The percentage amounts given are based on the weight of flour in the dough.

TABLE III

| Example 6 | 0.3% glycerol monostearate (added to broth) |
|---|---|
| Example 7 | 0.5% of a mixture of 60 parts by weight glycerol monostearate and 40 parts by weight ethoxylated glycerol monostearate consisting of about 55 weight percent ethylene oxide. (added to broth) |
| Example 8 | 0.25% of the mixture of Example 7, 0.1% of stearic acid, 0.003% (0.0055 SU. alpha amylase per 100 g. flour) Rhozyme S and 0.004% (about 0.04 DSU per 100 g. flour) Diastase 81 (added to broth) |
| Example 9 | Same as Example 8 (added at dough-up stage) |
| Example 10 | Same as Example 8 (Mixture of example 7 and stearic acid added to broth; enzymes added at dough-up stage) |
| Example 11 | Same as Example 6 (added to 25% flour broth) |
| Example 12 | Same as Example 7 (added to 25% flour broth) |

TABLE III-continued

| Example 13 | Same as Example 8 (added to 25% flour broth) |
| Example 14 | Same as Example 8 (added at dough-up stage of 25% flour broth) |
| Example 15 | Same as Example 8 (mixture of Example 7 and stearic acid added to 25% flour broth; enzymes added at dough-up stage) |
| Example 16 | Same as Example 6 (added to 50% flour broth) |
| Example 17 | Same as Example 7 (added to 50% flour broth) |
| Example 18 | Same as Example 8 (added to 50% flour broth) |
| Example 19 | Same as Example 8 (added at dough-up stage of 50% flour broth) |
| Example 20 | Same as Example 8 (mixture of Example 7 and stearic acid added to 50% flour broth; enzymes added at dough-up stage) |

The average results of periodic compressibility tests on eight (8) individual one-half inch thick slices of bread from each loaf prepared using the above described "continuous" dough recipe and the antistaling agents of Examples 6-20 are set forth in the following table. The data of the table are the average weight in grams required to compress the test samples of bread one and one-half (1½) centimeters.

TABLE IV

COMPRESSIBILITY TEST (grams)

| Antistaling Agent (Ex. No.) | 24 hours | 48 hours | 72 hours | 144 hours | 192 hours | 216 hours |
|---|---|---|---|---|---|---|
| 6 | 11.0 | — | 15.0 | — | 35.5 | — |
| 7 | 8.0 | — | 11.2 | — | 26.1 | — |
| 8 | 8.1 | — | 12.3 | — | 28.3 | — |
| 9 | 8.4 | — | 11.3 | — | 25.0 | — |
| 10 | 8.9 | — | 12.1 | — | 23.7 | — |
| 11 | — | 13.6 | 14.3 | 21.4 | 24.6 | — |
| 12 | — | 9.9 | 11.5 | 13.7 | 19.0 | — |
| 13 | — | 10.2 | 11.6 | 15.1 | 19.3 | — |
| 14 | — | 10.3 | 11.4 | 14.5 | 19.5 | — |
| 15 | — | 10.9 | 12.4 | 16.9 | 20.9 | — |
| 16 | 9.9 | — | 14.9 | — | 25.4 | 27.1 |
| 17 | 9.0 | — | 16.2 | — | 23.3 | 28.6 |
| 18 | 8.9 | — | 13.9 | — | 22.9 | 23.9 |
| 19 | 8.6 | — | 14.0 | — | 22.7 | 25.1 |
| 20 | 8.6 | — | 14.0 | — | 22.4 | 25.7 |

The data in Table IV regarding softness characteristics of bread prepared from a "continuous" dough recipe containing various antistaling additives again demonstrates the improvement in antistaling effect for the composition of this invention. Examples 6-10, relating to "no-flour" broths, show that the compositions of this invention, including mixtures of alpha amylase and amyloglucosidase, are as good or better than the glycerol ester alone or the mixture of glycerol ester and ethoxylated glycerol ester when used in equivalent amounts. Excellent results were also obtained for the tests involving the baked products prepared with the 25% flour broths (Examples 11-15) and the 50% flour broths (Examples 16-20). The overall results also indicate that with baked products prepared using a no flour broth in a "continuous" dough process some additional advantage is obtained when adding the antistaling agent at the dough-up stage. No difference was apparent with regard to softness when the antistaling agent was added to the formula (broth or dough-up) for either the 25% or 50% flour broths.

When viewing these results in the light of current costs for the additives involved, the combinations of this invention have a distinct economic advantage.

In the following examples, doughs for bread were prepared with the standard "sponge" dough recipe described in connection with Examples 1-5. The table below sets forth, for Examples 21-25, the antistaling additives and combinations thereof which were incorporated in the described "sponge" dough recipe. The percentage amounts are based on the weight of flour in the dough.

TABLE V

| Example 21 | 0.3% glycerol monostearate (added to shortening) |
| Example 22 | 0.2% glycerol monostearate and 0.1% stearic acid (added to shortening) |
| Example 23 | 0.2% glycerol monostearate and 0.1% palmitic acid (added to shortening) |
| Example 24 | 0.2% glycerol monostearate, 0.1% stearic acid (added to shortening) and 0.005% (0.0092 SU per 100 g flour) Rhozyme S (added separately at dough-up stage) |
| Example 25 | 0.2% glycerol monostearate, 0.1% palmitic acid (added to shortening) and 0.005% (0.0092 SU per 100 g. flour) Rhozyme S (added separately at dough-up stage) |

Compressibility tests, carried out as for previous examples were also performed on bread slices from loafs prepared with "sponge" dough incorporating the antistaling additives of the above examples. The data of the following table were acquired for compression depths of one and one-half centimeters with the Baker Compressimeter.

TABLE VI

COMPRESSIBILITY TEST (grams)

| Antistaling Additive (Ex. No.) | 24 hours | 96 hours | 144 hours | 192 hours |
|---|---|---|---|---|
| 21 | 15.5 | 36.8 | 38.6 | 46.0 |
| 22 | 15.3 | 32.8 | 34.6 | 43.1 |
| 23 | 13.3 | 34.0 | 36.6 | 44.0 |
| 24 | 15.9 | 31.6 | 33.2 | 39.8 |
| 25 | 17.0 | 28.8 | 32.0 | 38.8 |

The above results again demonstrate the excellent results for the antistaling compositions of this invention and particularly indicate that the free acid component may be varied with as good results.

The following table sets forth examples of several antistaling additive compositions of this invention which were incorporated in "sponge" dough, as described hereinbefore, and the baked products thereof tested for softness with the Baker Compressimeter.

TABLE VII

| Example 26 | 0.24% of a mixture of 60 parts by weight of glycerol monostearate and 40 parts by weight of ethoxylated glycerol monostearate consisting of about 55 weight percent ethylene oxide, and 0.1% stearic acid (added to shortening) |
| Example 27 | 0.24% of the mixture of Example 26 |

TABLE VII-continued

| | |
|---|---|
| | 0.1% stearic acid and 0.03% magnesium stearate (added to shortening) |
| Example 28 | 0.24% of the mixture of Example 26 0.1% stearic acid (both added to shortening) and 0.005% Rhozyme S (added to sponge) |

Compressibility tests on bread slices prepared for "sponge" dough and including the antistaling additives of Examples 26–28 were carried out as previously described herein and the results are reported in the following table for compressions to one and one-half and two centimeters.

TABLE VIII

| Antistaling Additive (Ex. No.) | COMPRESSIBILITY TESTS (grams) | | | | | | | |
|---|---|---|---|---|---|---|---|---|
| | 24 hours | | 96 hours | | 120 hours | | 144 hours | |
| | 1½ cm. | −2.0 cm. | 1½ cm. | −2 cm. | 1½ cm. | −2 cm. | 1½ cm. | −2 cm. |
| 26 | 13.0 | 15.6 | 20.2 | 25.7 | 28.4 | 33.6 | 29.2 | 34.6 |
| 27 | 13.8 | 16.3 | 21.6 | 26.6 | 28.2 | 33.6 | 26.9 | 31.9 |
| 28 | 13.2 | 15.6 | 22.7 | 27.3 | 27.6 | 32.5 | 26.8 | 31.6 |

From the above data it can be seen that additional softness in bread over a period of time is obtained when magnesium stearate is used in the formulation (Example 27) as well as when alpha amylase enzyme is used in the formulation (Example 28).

We claim:

1. A compositions of matter consisting essentially of (1) a glycerol ester of a $C_{10}$–$C_{24}$ saturated aliphatic fatty acid wherein at least 10 weight percent of said ester is a monoester, and (2) for each part by weight of said ester, from about 0.25 to about 1.0 part of a component selected from the group consisting of a free $C_{14}$–$C_{20}$ saturated aliphatic fatty acid, sodium and magnesium salts of said free acid, pentaerythritol monoester of said free acid and mixtures of said components.

2. The composition of claim 1 wherein at least about 30 up to about 50 weight percent of said glycerol ester is a condensation product of ethylene oxide, said ethylene oxide consisting of from about 10 up to about 95 weight percent of said condensation product.

3. The composition of claim 1 which additionally includes an enzyme product selected from the group consisting of alpha amylase, amyloglucosidase, mold derived lipase and mixture thereof in an amount sufficient to provide increased antistaling characteristics to a bakery product prepared from a dough containing an antistaling amount of said composition.

4. The composition of claim 2 wherein said saturated fatty acid of (1) is a $C_{14}$–$C_{20}$ acid, said ethylene oxide consists of from about 45 to about 75 percent of said condensation product and said composition includes an enzyme product selected from the group consisting of alpha amylase, amyloglucosidase and mixtures thereof in an amount sufficient to provide increased antistaling characteristics to a bakery product prepared from a dough containing an antistaling amount of said composition.

5. The composition of claim 4 wherein said saturated fatty acid of (1) is stearic acid, said free acid of (2) is stearic acid, said ethylene oxide consists of from about 60.5 to about 65 percent of said condensation product, and said condensation product is from about 35 to about 45 percent of said glycerol ester.

6. The composition of claim 5 wherein said component of (2) is stearic acid, said enzyme product is alpha amylase derived from Aspergillus Oryzae and said enzyme product is present in an amount of from about 0.006 to about 0.46 Saccharifying Units for each part by weight of said composition.

7. The composition of claim 5 wherein said component of (2) is stearic acid, said enzyme product is amyloglucosidase derived from Aspergillus Niger and said enzyme product is present in an amount of from 0.06 to 6.5 Dextrin Saccharifying Units by weight of said composition.

8. The compositions of claim 1 in intimate mixture with a bakery product dough in an amount sufficient to retard the staling of the bakery product prepared therefrom.

9. The composition of claim 4 in intimate mixture with a bakery product dough in an amount sufficient to retard the staling of the bakery product prepared therefrom.

10. The composition of claim 5 in intimate mixture with a bakery product dough in an amount sufficient to retard the staling of the bakery product prepared therefrom.

11. The composition of claim 6 in intimate mixture with a yeast-raised bakery product dough in an amount sufficient to retard the staling of the bakery product prepared therefrom.

12. A method comprising the steps of preparing a bakery product dough having intimately mixed therewith in an amount sufficient to retard staling of a baked product prepared therewith a composition of matter consisting essentially of (1) a glycerol ester of a $C_{10}$–$C_{24}$ saturated aliphatic fatty acid wherein at least 10 weight percent of said ester is a monoester, and (2) for each part by weight of said glycerol ester, from about 0.25 to about 1.0 part of a component selected from the group consisting of a free $C_{14}$–$C_{20}$ saturated aliphatic fatty acid, sodium or magnesium salt of said free acid, a pentaerythritol monoester of said free acid and mixtures thereof; preparing said dough for baking, and baking said dough.

* * * * *